United States Patent
Furukawa (10) Patent No.: US 11,665,332 B2
(45) Date of Patent: May 30, 2023

(54) INFORMATION PROCESSING APPARATUS, CONTROL METHOD THEREOF AND STORAGE MEDIUM

(71) Applicant: CANON KABUSHIKI KAISHA, Tokyo (JP)

(72) Inventor: Takeshi Furukawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 16/840,618

(22) Filed: Apr. 6, 2020

(65) Prior Publication Data

US 2020/0329228 A1    Oct. 15, 2020

(30) Foreign Application Priority Data

Apr. 11, 2019    (JP) .............................. JP2019-075361

(51) Int. Cl.
  *H04N 13/282*    (2018.01)
  *H04N 13/243*    (2018.01)
  *G06T 7/73*       (2017.01)

(52) U.S. Cl.
  CPC ............. *H04N 13/282* (2018.05); *G06T 7/73* (2017.01); *H04N 13/243* (2018.05)

(58) Field of Classification Search
  CPC ....... H04N 13/243; H04N 13/282; G06T 7/73
  See application file for complete search history.

(56) References Cited

U.S. PATENT DOCUMENTS

| | | | | |
|---|---|---|---|---|
| 2006/0028552 | A1* | 2/2006 | Aggarwal | G06K 9/00295 348/169 |
| 2014/0361909 | A1* | 12/2014 | Stelfox | G06F 16/955 340/870.07 |
| 2015/0116501 | A1* | 4/2015 | McCoy | H04N 5/23299 348/169 |
| 2015/0294492 | A1* | 10/2015 | Koch | H04N 13/243 345/426 |
| 2016/0008662 | A1* | 1/2016 | Cronin | G01S 5/02 382/103 |
| 2018/0056124 | A1* | 3/2018 | Marty | G06T 7/20 |
| 2018/0260988 | A1* | 9/2018 | Huang | G06T 17/20 |
| 2019/0072390 | A1* | 3/2019 | Wang | G06T 19/006 |
| 2019/0156081 | A1* | 5/2019 | Pous | G06K 7/10297 |
| 2019/0236531 | A1* | 8/2019 | Adato | G06K 9/00771 |

FOREIGN PATENT DOCUMENTS

| | | |
|---|---|---|
| JP | 2008107895 A | 5/2008 |
| JP | 2018067106 A | 4/2018 |

* cited by examiner

*Primary Examiner* — Jeremiah C Hallenbeck-Huber
(74) *Attorney, Agent, or Firm* — Rossi, Kimms & McDowell LLP (57) ABSTRACT

To prevent an object that should exist in a virtual viewpoint video image from disappearing suddenly. Positional information on a specific object is acquired from a positional information notification unit included in the specific object. Then, based on the positional information, three-dimensional shape data on the specific object is output in association with information specifying a position of the specific object in a three-dimensional space.

12 Claims, 8 Drawing Sheets

VIRTUAL VIEWPOINT VIDEO IMAGE SPACE

INFORMATION PROCESSING APPARATUS, CONTROL METHOD THEREOF AND STORAGE MEDIUM

BACKGROUND

Field

The present disclosure relates to an image processing technique.

Description of the Related Art

In recent years, a technique called a virtual viewpoint video image has been attracting attention, in which an object can be viewed as a video image that captures the object from a variety of viewpoints and angles. According to this virtual viewpoint video image, for example, it is possible to view a highlight scene of soccer or basketball from a variety of angles, and therefore, it is possible to give a user a high feeling of being at a live performance compared to a normal video image. The virtual viewpoint video image such as this is generated from video images captured from a number of directions at the same timing by using a plurality of cameras installed so as to surround an object.

As disclosed in Japanese Patent Laid-Open No. 2018-67106, normally, at the time of the generation of a virtual viewpoint video image, first, three-dimensional shape data representing the three-dimensional shape of an object existing in the image capturing scene is generated. Specifically, a silhouette image obtained by extracting the silhouette of an object is generated by performing foreground/background segmentation processing to segment into the object that is the foreground and the other background by taking each frame (still image) of the video images captured by a plurality of cameras as a target. Then, from the obtained silhouette image, three-dimensional shape data representing the three-dimensional shape of the object is generated. Then, a video image representing an appearance from a virtual viewpoint is obtained based on information on the virtual viewpoint specified by a user and the three-dimensional shape data.

Here, for the generation of a silhouette image, the background difference method, the inter-frame difference method, or the like is used. Then, as regards the background difference method, a technique is known that makes it also possible to deal with a change in the background due to a change in the illumination condition or the like by updating the background based on a newly captured video image.

In a case where the background difference method in which the updating of the background as described above is performed is used, the object that does not move for a predetermined time is identified as the background and it is handled as a part of the background afterward. Because of this, it is no longer possible to generate the three-dimensional shape data on an object that does not move. Then, the virtual viewpoint video image is not generated based on the three-dimensional shape data, and therefore, the object that has existed so far in the virtual viewpoint video image suddenly disappears as a result.

Consequently, an object of the present disclosure is to prevent an object that has existed so far in a virtual viewpoint video image from disappearing suddenly.

SUMMARY

The information processing apparatus according to the present disclosure includes: an acquisition unit configured to acquire positional information on a specific object from a positional information notification unit included in the specific object; and an output unit configured to output, based on the positional information, three-dimensional shape data on the specific object in association with information specifying a position of the specific object in a three-dimensional space.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
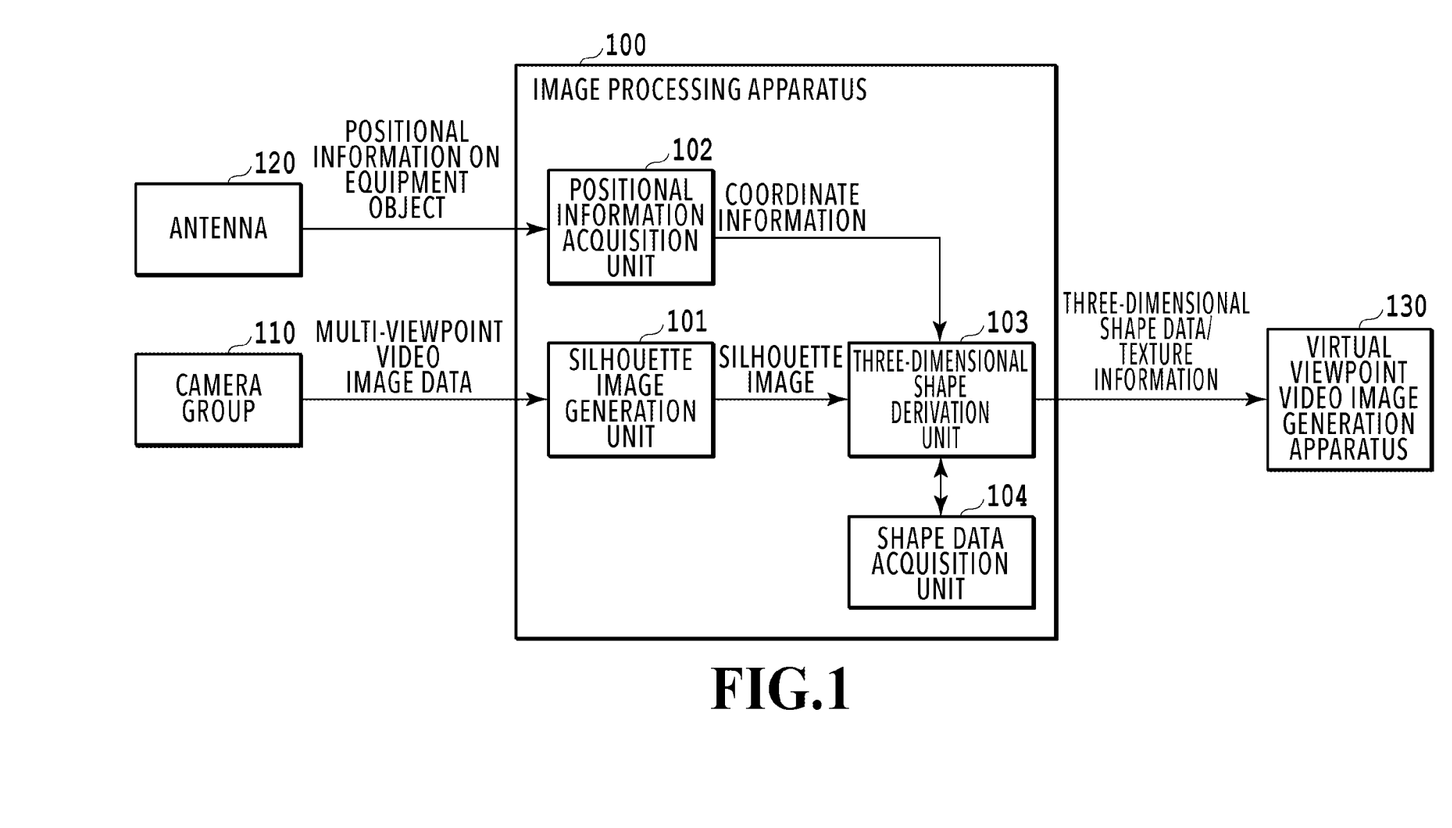
FIG. 1 is a diagram showing an example of a configuration of an image processing system.

FIG. 1 is a diagram showing an example of the configuration of an image processing system that generates a virtual viewpoint video image in the present embodiment. The virtual viewpoint video image is a video image generated by an end user and/or an appointed operator or the like freely operating the position and orientation of a virtual viewpoint (virtual camera that does not exist actually) and also called a free-viewpoint video image, an arbitrary viewpoint video image, and the like. Further, in the present embodiment, a moving image is supposed, but a still image may be supposed. The image processing system shown in FIG. 1 has an image processing apparatus 100, a camera group 110, an antenna 120, and a virtual viewpoint video image generation apparatus 130.

The image processing apparatus 100 receives video image data from the camera croup 100. This video image data is video images captured from a plurality of different viewpoints (hereinafter, called "multi-viewpoint video image") data. Then, from the received multi-viewpoint video image data, data (three-dimensional shape data, hereinafter, also described as "three-dimensional model") representing the three-dimensional shape of an object and information (hereinafter, called "texture information") representing the color and texture of an object are generated. The three-dimensional model and the texture information, which are generated, are sent to the virtual viewpoint video image generation apparatus 130. The texture information that is transmitted has at least one of color information, luminance information, and saturation information, on the surface of the object. The texture information may be transmitted in the form of a captured image or a foreground image, or may be transmitted in the form of a texture image in which each element configuring the three-dimensional model is associated with the texture information in correspondence to the three-dimensional model.

The camera group 100 includes a plurality of digital video cameras (hereinafter, digital video camera is described simply as "camera"). Each camera comprises a video image signal interface represented by the serial digital interface (SDI) and outputs captured moving image data to the image processing apparatus 100 via the video image signal interface.

The antenna 120 is an antenna for RFID (Radio Frequency Identification) and receives an electric wave transmitted from an RF tag as a positional information notification unit attached to a specific object existing in the image capturing scene and acquires the positional information based on the electromagnetic field intensity of the electric wave. Here, the specific object that is the target for which the positional information is to be acquired is an object in the motionless state, which does not move for a predetermined time. Specifically, the specific object includes an object that is basically motionless in the image capturing scene of the multi-viewpoint video image, which is the source of a virtual viewpoint video image, or an object that moves between frames of a moving image but which sometimes stops and remains motionless for a predetermined time. For example, in a case where the game of rugby is taken as the image capturing scene, the corner flag that is installed on the field corresponds to the example of the former object and the rugby ball corresponds to the example of the latter object. In the following, in order to distinguish the object, such as the corner flag and the ball, which is the positional information acquisition target, from the typical foreground object, such as a player and a referee, and the typical background object, such as a spectator stand of a stadium, the object is called "equipment object". The acquisition method of positional information is not limited to the above-described RFID and for example, it may also be possible to use GPS, wireless LAN, or the like. Further, in place of the electric wave, it may also be possible to use an electromagnetic wave including light and sound. What is required is that it is possible to obtain positional information on an equipment object by a notification from a positional information notification unit attached to the equipment object.

The virtual viewpoint video image generation apparatus 130 generates a virtual viewpoint video image representing the appearance from the virtual viewpoint specified by a user by performing rendering processing using the three-dimensional model and the texture information, which are received from the image processing apparatus 100. It is assumed that the three-dimensional model of the present embodiment is input to the virtual viewpoint video image generation apparatus 130 in the state where a voxel group representing the three-dimensional shape of an object is arranged on a three-dimensional space as the virtual viewpoint video image space. Then, it is assumed that in rendering processing, a virtual viewpoint video image is obtained by performing processing to paste a texture to the surface of the three-dimensional shape of the object represented by the three-dimensional model in accordance with the virtual viewpoint information that is input separately. The generated virtual viewpoint video image data is output and displayed on a display device, not shown schematically, represented by a liquid crystal display or the like, and a user is provided with a view of the virtual viewpoint video image data.

(Hardware Configuration of Image Processing Apparatus)

Figure 2:
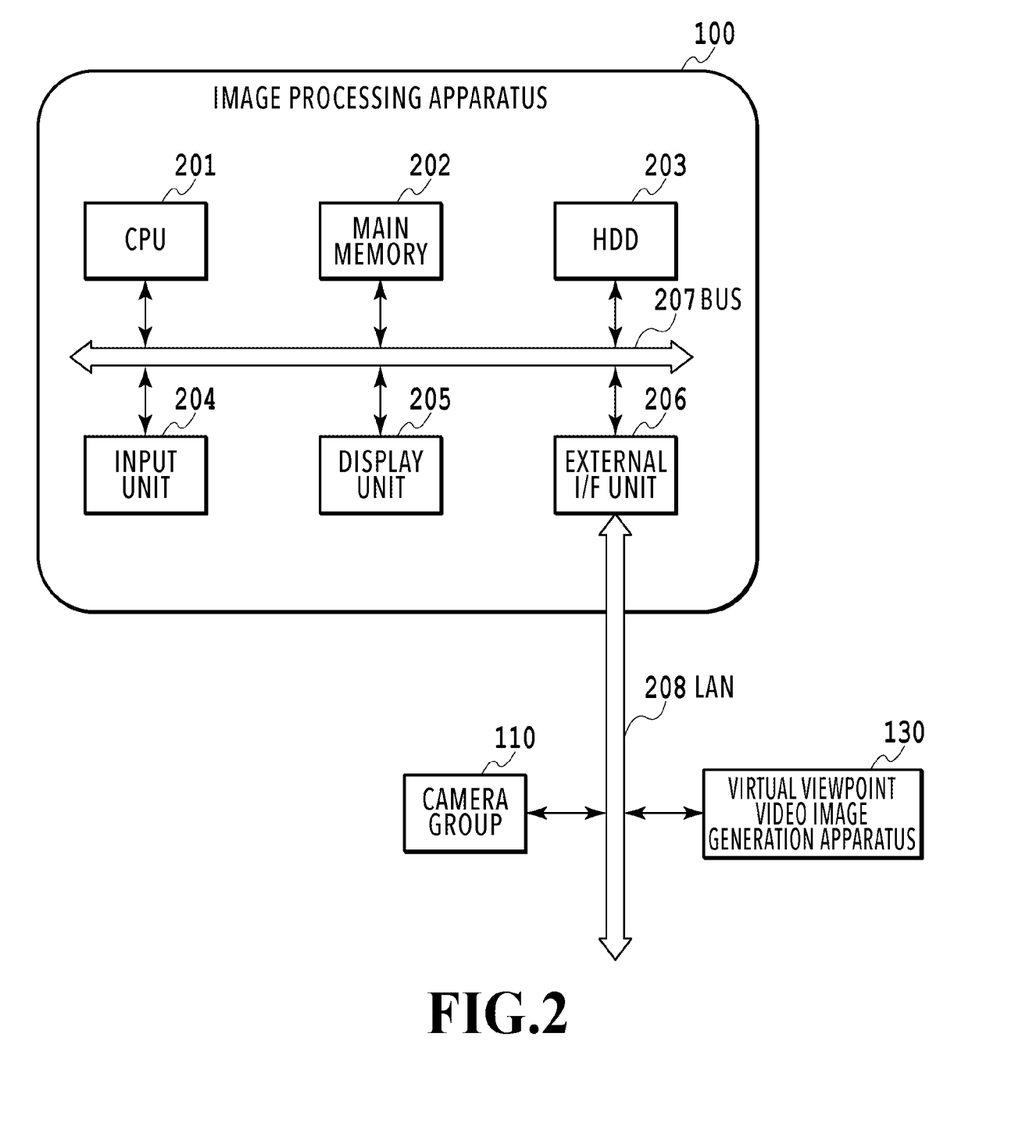
FIG. 2 is a diagram showing an example of a hardware configuration of an image processing apparatus.

FIG. 2 is a diagram showing an example of the hardware configuration of the image processing apparatus 100. The image processing apparatus 100 has a configuration that a general information processing apparatus has, specifically, the image processing apparatus 100 comprises a CPU 201, a main memory 202, an HDD 203, an input unit 204, a display unit 205, and an external 11F 206 and each unit is connected via a bus 207. First, the CPU 201 is a central processing unit configured to centralizedly control the image processing apparatus 100 and performs a variety kinds of image processing, to be described later, by executing various programs stored in the HDD 203 and the like. The main memory 202 provides a work area to the CPU 201 as well as temporarily storing data, parameters, and the like, which are used in various kinds of processing. The HDD 203 is a nonvolatile large-capacity storage device that stores various programs, input video image data, and the like, and the HDD 203 may be, for example, an SSD or the like. The input unit 204 is a device, such as a keyboard, a mouse, an electronic pen, a touch-sensitive panel, and the like, and receives a variety of user inputs. The display unit 205 includes a liquid crystal panel and the like, and displays a UI screen, and so on. The external I/F unit 206 is a communication interface that performs transmission and reception of various kinds of data, such as multi-viewpoint video image data and three-dimensional models, with each camera configuring the camera group 110 and the virtual viewpoint video image generation apparatus 130 via a network (here, LAN 208). The bus 207 connects each unit described above and performs data transfer.

The virtual viewpoint video image generation apparatus 130 also comprises the same configuration as that of the image processing apparatus 100 and performs the above-described rendering processing and the like using the CPU and the main memory.

(Software Configuration of Image Processing Apparatus)

Next, with reference to FIG. 1 described previously, the software configuration of the image processing apparatus 100 is explained. In FIG. 1, within the frame indicating the image processing apparatus 100, four function units, that is, a silhouette image generation unit 101, a positional information acquisition unit 102, a three-dimensional shape derivation unit 103, and a shape data acquisition unit 104 are shown. In the following, each unit is explained.

The silhouette image generation unit 101 generates a silhouette image of an object, which is a foreground, by taking the multi-viewpoint video image data that is input from the camera group 110 as a target. The silhouette image is a single-color image representing a two-dimensional shape of an object by filling the inside of the contour of the object and representing each pixel by a binary value. The silhouette image generation unit 101 of the present embodiment obtains a silhouette image by using the background difference method, that is, by finding the difference between each frame (still image) that is input in a time series and the background image prepared in advance and binarizing the difference. Not limited to binarization, any image may be accepted as long as the foreground area is distinguished from the other areas. Further, the silhouette image generation unit 101 updates the background image in a case where the difference from the background is the same contents and this continues for a predetermined time, such as a case where there is a change in the illumination condition. Due to this, it is possible to derive a silhouette image without being affected by the change in the illumination condition and the like. Further, the silhouette image generation unit 101 generates image data as texture information, which represents the color and texture of a two-dimensional shape represented by each derived silhouette image. The silhouette image data and the texture information, which are derived and generated, are input to the three-dimensional shape derivation unit 103.

The positional information acquisition unit 102 acquires positional information on an equipment object from the antenna 120. Further, the positional information acquisition unit 102 transforms the acquired positional information into coordinate information in a real-world space and then performs processing to transform the coordinate information into coordinate information in a virtual viewpoint video image space. Details of this transformation processing will be described later. The coordinate information on the equipment object in the virtual viewpoint video image space, which is obtained by the transformation, is input to the three-dimensional shape derivation unit 103.

The three-dimensional shape derivation unit 103 generates and outputs three-dimensional shape data on the object based on the silhouette image generated by the silhouette image generation unit 101 and the coordinate information on the equipment object in the virtual viewpoint video image space, which is generated by the positional information acquisition unit 102. The object that is the three-dimensional shape generation target is a foreground and an object that behaves as a moving object throughout at least a plurality of frames. As the data format of three-dimensional shape data, there are a voxel format, a point cloud format, and the like, and any data format may be accepted as long as the data format can specify the three-dimensional shape of an object. For the derivation of a three-dimensional shape from a silhouette image, the visual volume intersection method (shape from silhouette method) that is used generally, or the like is used. The visual volume intersection method is a method of obtaining the three-dimensional shape of an object by inversely projecting a plurality of silhouette images captured by a plurality of cameras and whose viewpoints are different onto a three-dimensional space, and finding the intersection portion of each visual volume. Details of the three-dimensional shape data generation processing in the present embodiment will be described later.

The shape data acquisition unit 104 performs processing to read and acquire the three-dimensional shape data on an equipment object prepared in advance and saved in the HDD 203 in response to a request from the three-dimensional shape derivation unit 103. In the present embodiment, it is assumed that the data on elements (here, voxel group) representing the three-dimensional shape of the corner flag, which is generated in advance, is saved in the HDD 203 in association with the positional information thereon. The element data representing the three-dimensional shape of an equipment object may be saved in an apparatus separate from the image processing apparatus 100, for example, such as an external storage.

(Equipment Object Positional Information)

Figure 3A:
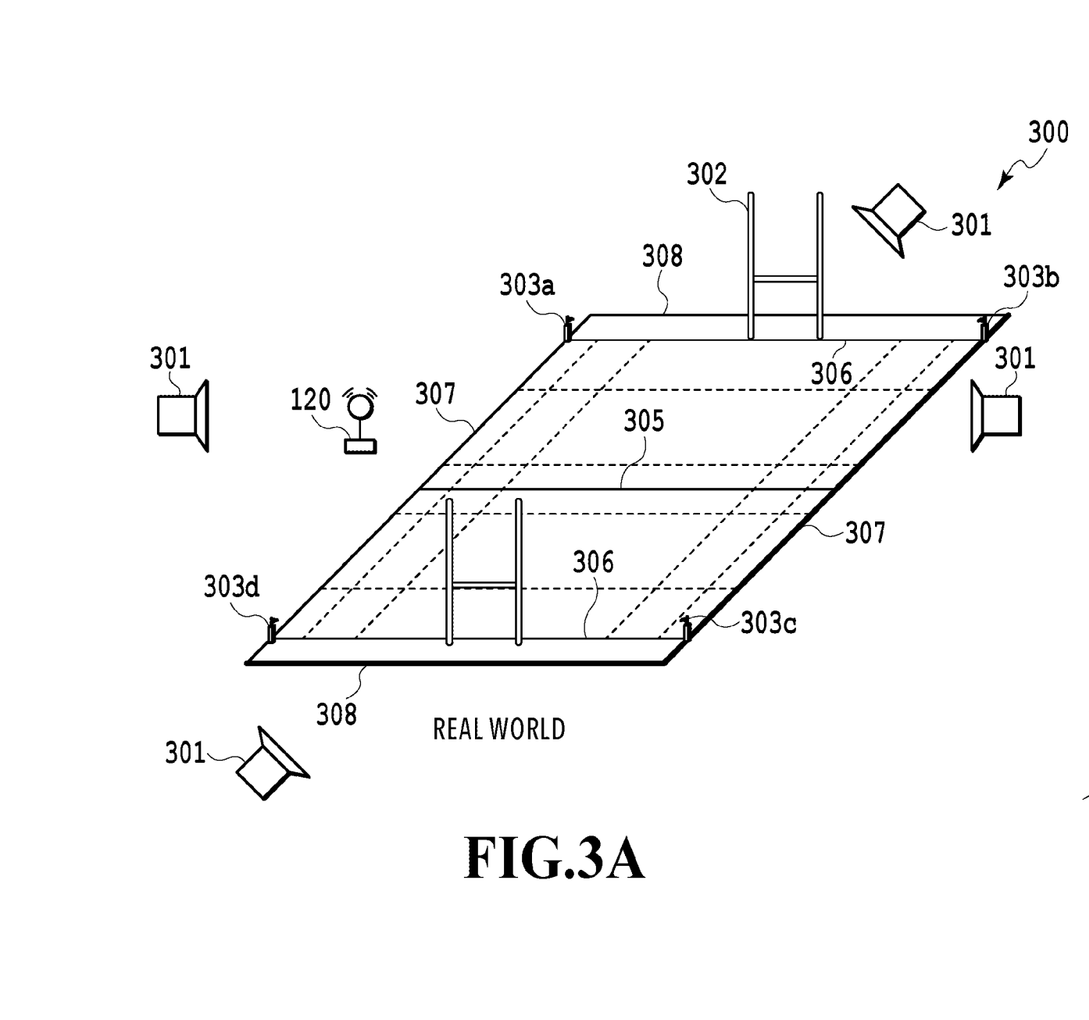
FIG. 3A is a diagram in a case where a filed on the real-world space on which nigby is played is viewed from a bird's eye and FIG. 3B is an enlarged diagram of a part of FIG. 3A.
Figure 3B:
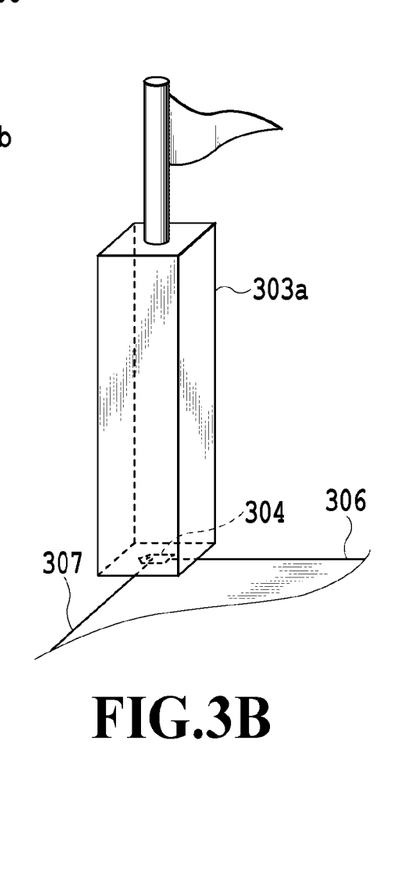
Figure 4:
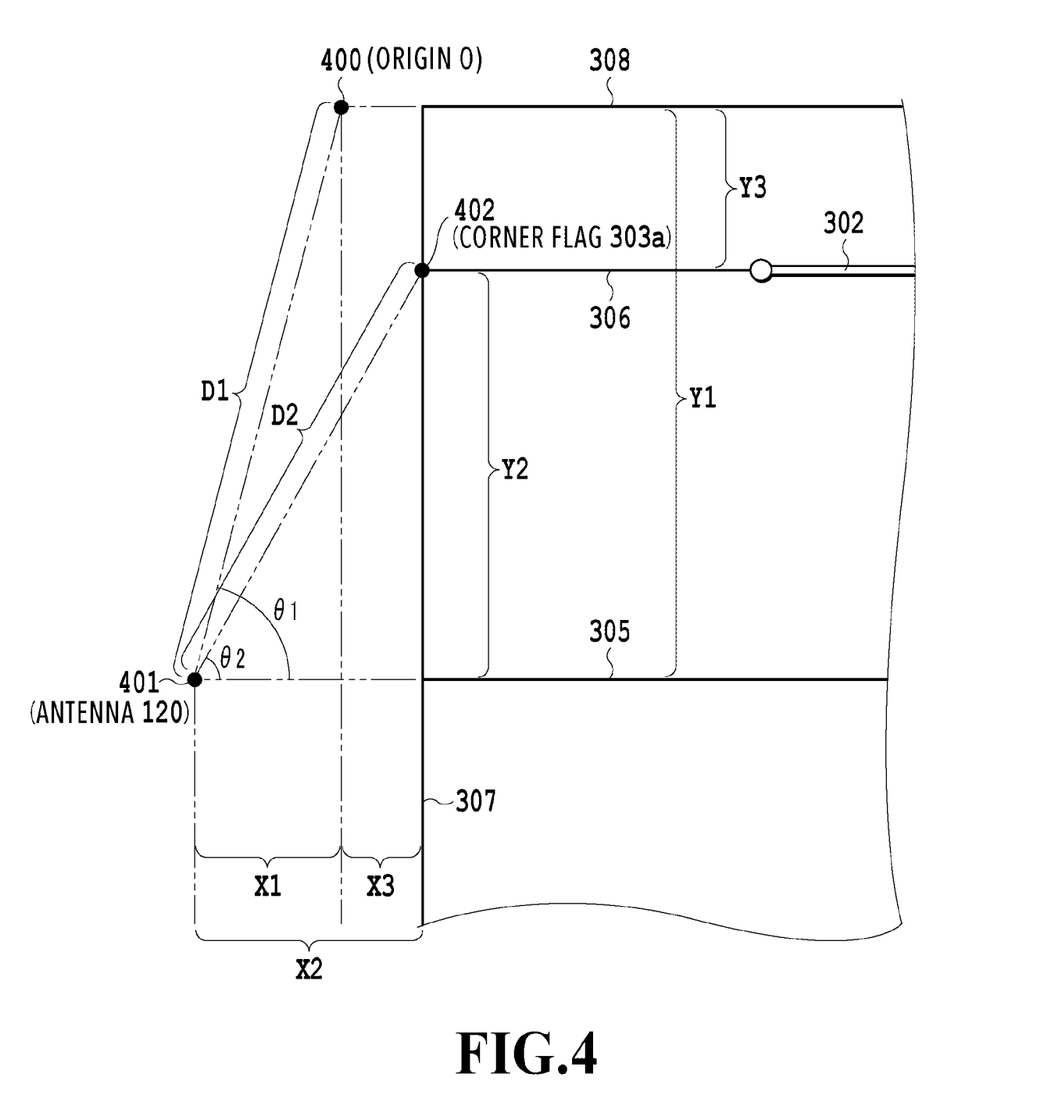
FIG. 4 is a diagram explaining positional information.

Before explaining the generation method of a three-dimensional model in the present embodiment, the equipment object positional information that is acquired by the antenna 120 is explained by taking a case as an example where the game of rugby is taken as the image capturing scene. FIG. 3A is a diagram in a case where a field 300 in the real-world space, on which rugby is played, is viewed from a bird's eye and around the field 300, a plurality of cameras 301 for capturing a multi-viewpoint video image, which is the source of a virtual viewpoint video image, is arranged. The multi-viewpoint video image is obtained by the plurality of cameras 301 performing image capturing in synchronization from directions different from one another. In FIG. 3A, the number of cameras is four, but in an actual environment, such as a stadium, more cameras are arranged. Further, to the side of the field 300, the antenna 120 for acquiring the positional information on corner flags 303*a* to 303*d* as equipment objects is installed. FIG. 4 is a diagram in a case where the antenna 120 and the periphery thereof are viewed from directly above and the antenna 120 is arranged at a position 400 on an extension of a halfway line 305. The enlarged diagram shown in FIG. 3B shows the way an RF tag 304 for acquiring positional information is embedded in the bottom of the corner flag 303*a* installed at the intersection of a goal line 306 and a touch line 307. The RF tag is embedded similarly in the other corner flags 303*b* to 303*d*. To each of the RF tags 303*a* to 303*d*, an ID is assigned so that each RF tag can be identified. The RF tag is also called RFID tag, IC tag, non-contact tag, electronic tag, and the like. The antenna 120 acquires information on the distance to each of the corner flags 303*a* to 303*d* and the direction in which each of the corner flags 303*a* to 303*d* exists. For example, in a case of the corner flag 303*a*, information on a distance 401 from the installation position of the antenna 120 to the RF tag 304 and information on an angle 402 with respect to the reference halfway line 305 are acquired.

(Generation of Three-Dimensional Model)

Figure 5:
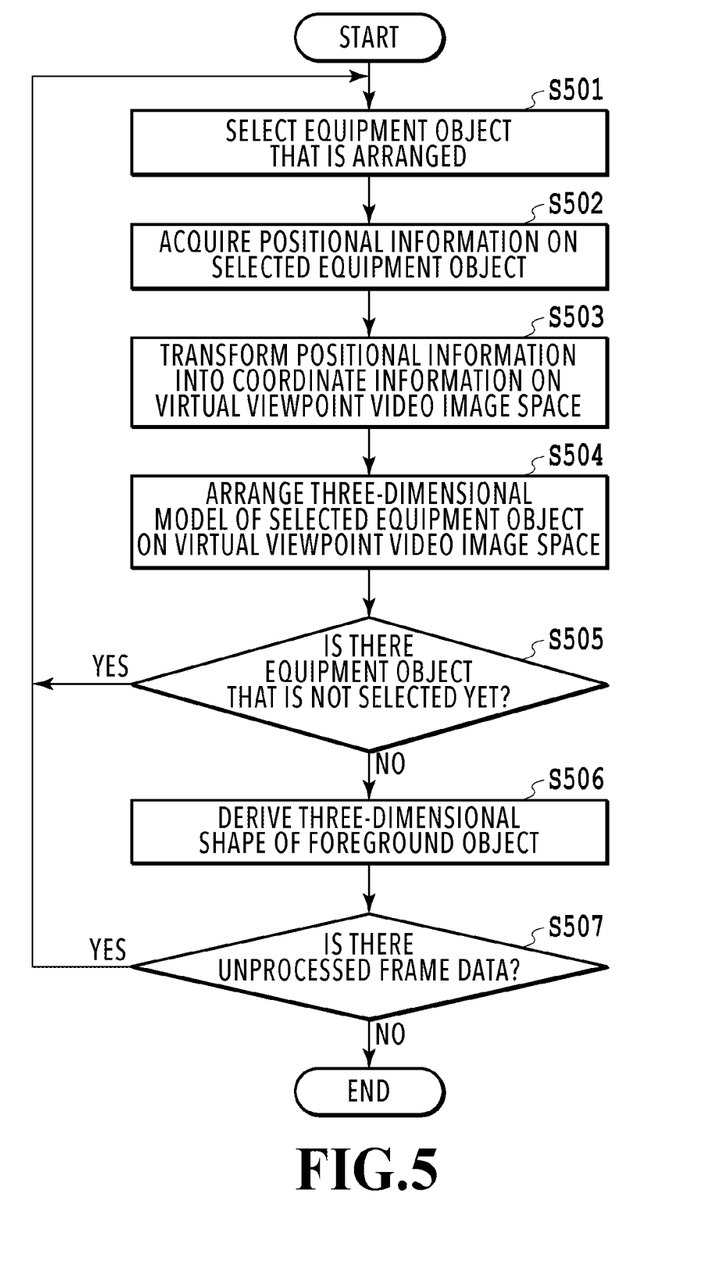
FIG. 5 is a flowchart showing a flow of processing in the image processing apparatus.

Following the above, processing in the image processing apparatus 100 according to the present embodiment is explained with reference to the flowchart in FIG. 5. Each piece of processing shown in this flowchart is implemented by the CPU 201 reading the control program stored in the HDD 203 onto the main memory 202 and executing the program. In the following explanation, "S" means a step.

At S501, an equipment object that is arranged on the target three-dimensional space of the virtual viewpoint video image (hereinafter, called "virtual viewpoint video image space") is selected. That is, the equipment object to which the above-described RF tag is attached, which appears in the image capturing scene of the multi-viewpoint video image, is selected. In a case of the present embodiment, the equipment objects, which are selection candidates, are listed and an operator selects an equipment object by using a mouse or the like while referring to the list displayed on the UI screen. In a case where the game of rugby is taken as the image capturing scene, the equipment objects, for example, such as the corner flag, the ball, and the goal post, are registered in the list and an operator selects the equipment object that the operator desires to arrange in the virtual viewpoint video image space from the list. Here, explanation is continued on the assumption that the corner flags 303*a* to 303*d* shown in FIG. 3A are selected.

At next S502, the positional information on the equipment object selected at S501, that is, the information on the distance to the antenna 120 and the angle is acquired. In a case of the present embodiment, the positional information on each of the corner flags 303*a* to 303*d* is transmitted from the antenna 120. The acquired positional information is input to the positional information acquisition unit 102.

At next S503, the positional information acquisition unit 102 transforms the input positional information into coordinate information on the virtual viewpoint video image space. Specifically, first, the information on the distance and the direction (angle) is transformed into coordinate information on the real world. Here, for simplification of explanation, a case is explained as an example where the information is transformed into two-dimensional coordinate information, but the way of thinking is the same also in a case where information is transformed into three-dimensional coordinate information. Here, the coordinates of a position 400 of an origin O shown in FIG. 4 are taken to be O (X, Y)=(0, 0). It is assumed that the position 400 of the origin O is located at a position whose distance D1 from the position 401 at which the antenna is installed is 72.9 m and whose angle θ1 formed by a line connecting the position 400 and the position 401 and the extension of the halfway line is 75°. The angle and the distance are known, and therefore, it is possible to find a distance X1 in the horizontal direction and a distance Y1 in the vertical direction from the position 400 of the origin O to the position 401 at which the antenna 120 is installed by using the trigonometric function. The distance X1 and the distance Y1 in this case are expressed by the following formula (1) and formula (2), respectively.

$$X1 = D1 \cdot \cos \theta1 \quad \text{formula (1)}$$

$$Y1 = D1 \cdot \sin \theta1 \quad \text{formula (2)}$$

Here, the distance D1 is 72.9 m and the angle θ1 is 75% and therefore, from the above-described formulas (1) and (2), the distance X1=18.9 m and the distance Y1=70.0 m. Similarly, it is possible to find the distance in the horizontal direction and the distance in the vertical direction from the position 400 of the origin O to the position 402 at which the corner flag 303a (≈RF tag 304) is installed. With respect to the position 401 at which the antenna 120 is installed, the position 402 of the RF tag 304 is located at a position whose distance D2 is 57.8 m and whose angle θ2 is 60°. In this case, a distance X2 in the horizontal direction and a distance Y2 in the vertical direction to the position 402 of the RF tag 304 are, from the above-described formulas (1) and (2), the distance X2=28.9 in and the distance Y2=50.0 m. Then, a distance X3 in the horizontal direction and a distance Y3 in the vertical direction from the position 400 of the origin O to the position 402 of the RF tag 304 are found by using the following formula (3) and formula (4).

$$X3 = X2 - X1 \quad \text{formula (3)}$$

$$Y3 = Y1 - Y2 \quad \text{formula (4)}$$

Here, X2=28.9 m and X1=18.9 m, and therefore, X3=10.0 m, and Y2=50.0 m and Y1=70.0 m, and therefore, Y3=20.0 in.

Then, the distance X3 and the distance Y3 from the origin O, which are found, are transformed in to the coordinates on the virtual viewpoint video image space. Here, in a case where it is assumed that transformation into spatial coordinates is performed in units of 0.1 m, the distance X3 is "100" and the distance Y3 is "200". That is, the position 402 of the RF tag 304 as the installation position of the corner flag 303a can be represented by the coordinate information of (X, Y)=(100, 200). The coordinate information thus obtained on the real-world space, which represents the position of each RF tag, is further transformed into the coordinate information on the virtual viewpoint video image space as needed. In the present embodiment, the coordinates on the real-world space are taken as the coordinates on the virtual viewpoint video image space as they are. That is, the coordinates (X, Y)=(100, 200) representing the position 402 of the RF tag 304 on the real-world space correspond to the coordinates (X, Y)=(100, 200) on the virtual viewpoint video image space. Consequently, the coordinate information on the real-world space obtained as described above is input to the three-dimensional shape derivation unit 103 as the coordinate information on the virtual viewpoint video image space. In a case where the origin or the unit of the coordinate is different between the real-world space and the virtual viewpoint video image space, it is sufficient to further perform necessary transformation processing at this step.

Figure 6A:
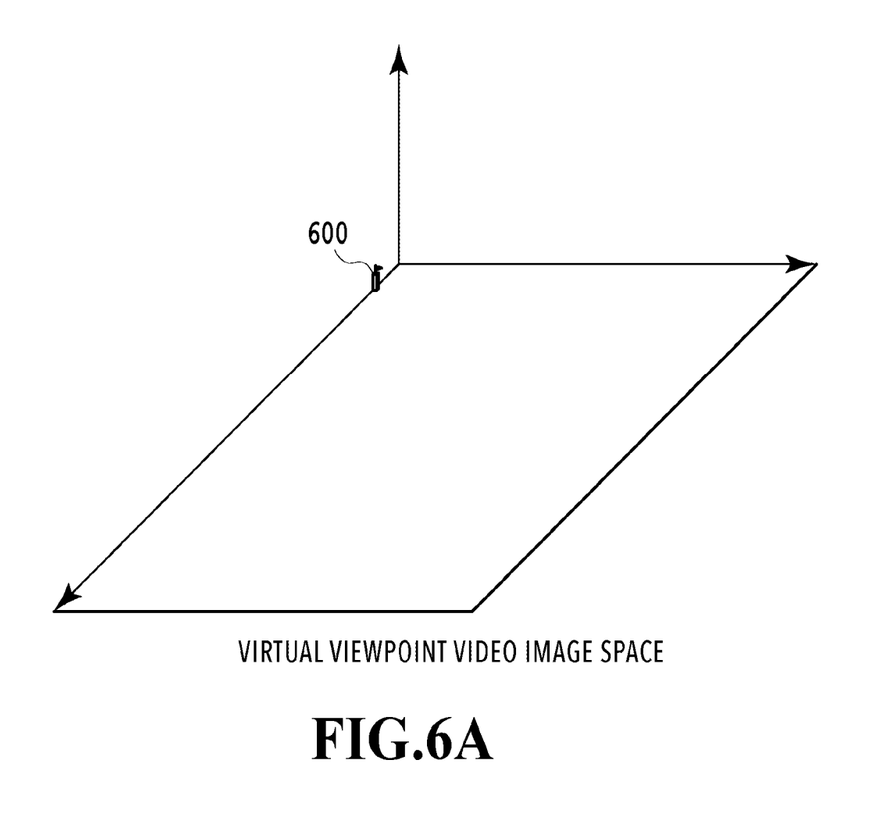
FIG. 6A is a diagram showing the way a voxel group representing a three-dimensional shape of a corner flag is arranged on a virtual viewpoint video image space and FIG. 6B is a diagram showing a voxel group of the corner flag.
Figure 6B:
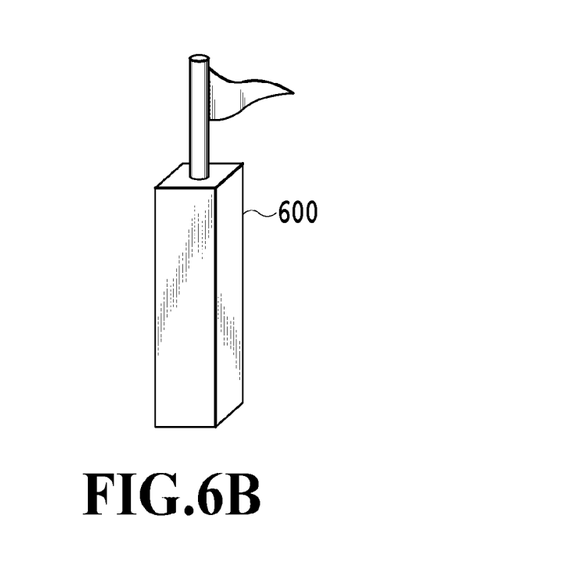

Next, at S504, the three-dimensional shape derivation unit 103 reads the data specifying the three-dimensional shape of the selected equipment object from the HDD 203 via the shape data acquisition unit 104 and arranges the data on the virtual viewpoint video image space based on the coordinate information obtained at S503. In a case of the corner flag 303a of the present embodiment, at the position of the coordinates (X, Y)=(100, 200) on the virtual viewpoint video image space, the voxel group representing the three-dimensional shape of the corner flag 303a is arranged. FIG. 6A is a diagram showing the way a voxel group 600 representing the three-dimensional shape of the corner flag 303a is arranged on the virtual viewpoint video image space.

At S505, whether there is an equipment object that should be arranged but is not selected yet is determined. In a case where there is another equipment object that should be arranged, the processing returns to S501 and the selection of an equipment object is continued. On the other hand, in a case where the arrangement of the equipment objects has been completed, the processing advances to step S506. It may also be possible to register in advance the arrangement-target equipment objects so that the equipment object is selected automatically, or it may also be possible to specify the equipment object each time by the user instructions described previously. In this manner, the three-dimensional models of other equipment objects, such as the corner flags 303b to 303d other than the corner flag 303a, are also arranged on the virtual viewpoint video image space.

At S506, the three-dimensional shape derivation unit 103 derives the three-dimensional shape of a foreground object, such as a player, by using a plurality of silhouette images corresponding to different viewpoints, which are input from the silhouette image generation unit 101. In this manner, object arrangement data in which, in addition to the voxel group representing the three-dimensional shape of the foreground object, the voxel group representing the three-dimensional shape of the equipment object is arranged on the virtual viewpoint video image space is obtained. The obtained object arrangement data is output to the virtual viewpoint video image generation apparatus 130.

Then, at S507, whether the processing has been completed for all the frame data is determined. In a case where there is an unprocessed frame, the processing returns to S501 and the processing that takes the next frame data as a target is continued.

The above is the contents of the three-dimensional shape derivation processing according to the present embodiment. In this manner, it is also possible to obtain, for a motionless object whose silhouette does not appear on the silhouette image, the object arrangement data in which the element (voxel group or the like) representing the three-dimensional shape of the object is arranged on the virtual viewpoint video image space.

Modification Example

Figure 7A:
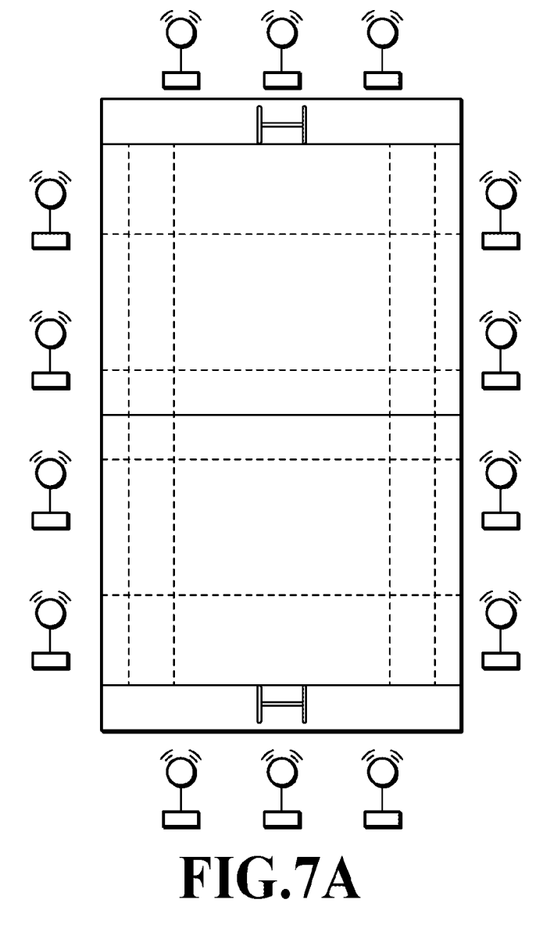
FIG. 7A and FIG. 7B are each a diagram showing an example in which a plurality of antennas is arranged.
Figure 7B:
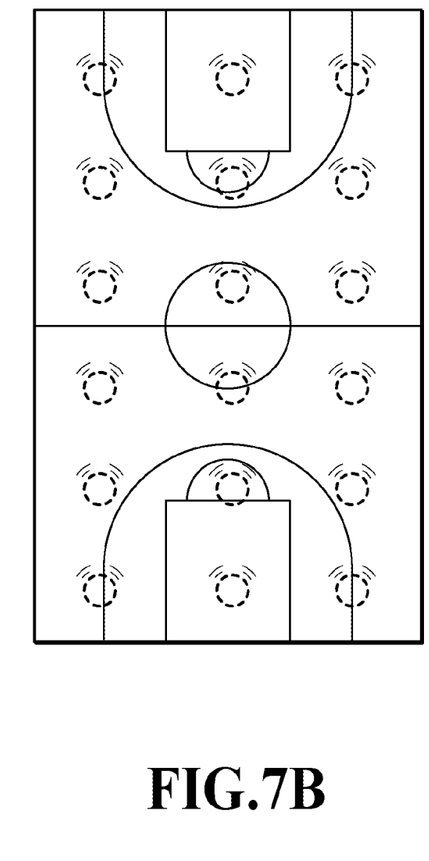

In the present embodiment, explanation is given by taking the case as an example where there is one antenna, but for example, it may also be possible to arrange a plurality of antennas so as to surround the field as shown in FIG. 7A. Further, in a case where image capturing is performed for an indoor game, such as basketball, it may also be possible to arrange a plurality of antennas under the floor of a gymnasium as shown in FIG. 7B. By using a plurality of antennas, it is possible to acquire positional information on an equipment object with a high accuracy.

Figure 8A:
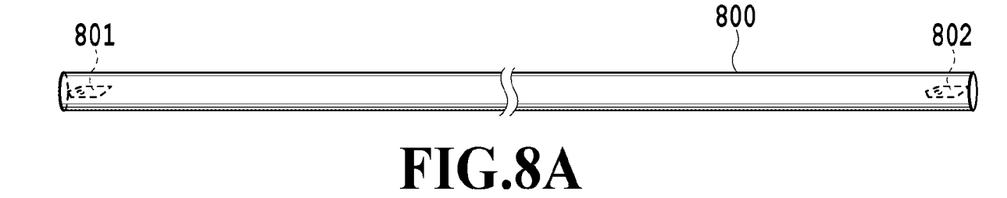
FIG. 8A to FIG. 8C are each a diagram showing an example in which a plurality of RF tags is embedded in one equipment object.
Figure 8B:
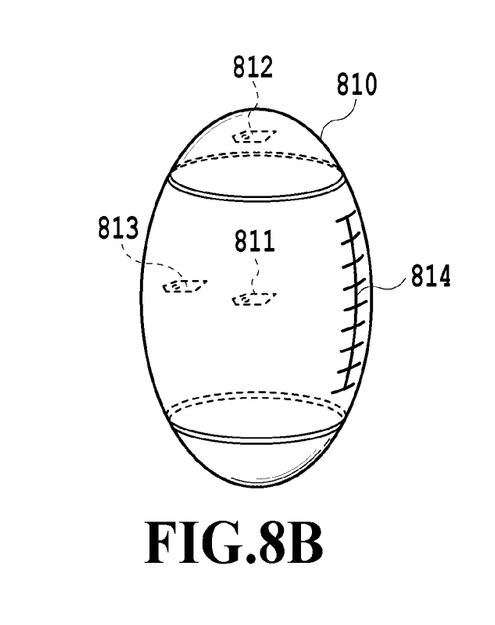
Figure 8C:
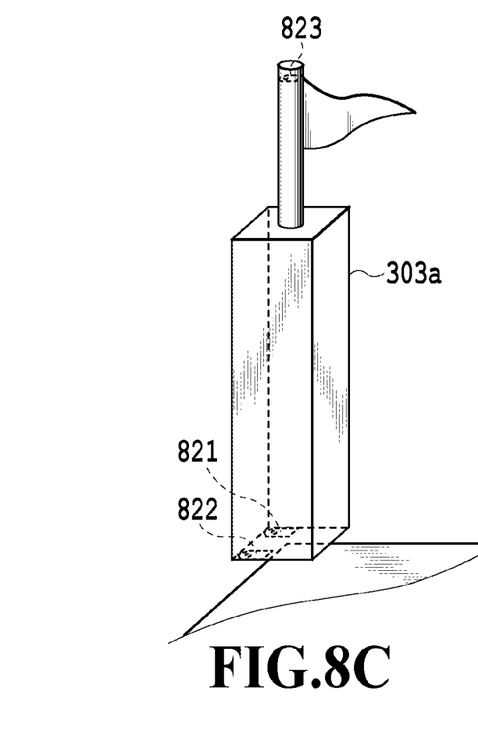

Further, in the present embodiment, explanation is given by taking the case as an example where one RF tag is attached to one equipment object, but it may also be possible to attach a plurality of RF tags. By attaching a plurality of RF tags to one equipment object, it is made possible to specify a more detailed situation, such as the orientation, not only the position. FIG. 8A to FIG. 8C each show an example in which a plurality of RF tags is embedded in one equipment object. FIG. 8A is an example of a case where two RF tags are attached, that is, RF tags 801 and 802 are embedded in both ends of a bar 800 of pole vault. By using the two RF tags as described above, it is possible to obtain the coordinates of two points on the virtual viewpoint space. That is, a segment on the virtual viewpoint space is obtained, and therefore, it is possible to reproduce the situation in which the bar of pole vault is installed, the situation in which the bar falls, and the like on the virtual viewpoint space. FIG. 8B is an example of a case where three RF tags are attached, that is, one RF tag 811 is embedded in the center of a ball 810 used in American football and two RF tags 812 and 813 are embedded near the surface. The ball 810 is elliptic in shape and provided with a seam 814 on the side. In this case, it is not possible to specify, for example, whether the ball is in the upright state or in which direction the seam 814 faces only by the coordinate information on two points. However, as shown in FIG. 8B, in a case where the RF tags are embedded in three portions, it is possible to derive a plane that includes three points, and therefore, it is possible to arrange a three-dimensional model (voxel group, point cloud, and the like) in accordance with the plane. Due to this, it is made possible to arrange even an object of complex shape with the correct orientation on the virtual viewpoint video image space. For example, also for the corner flag used in the explanation of the present embodiment, by embedding three RF tags 821 to 823 in three portions as shown in FIG. 8C, it is possible to arrange the corner flag on the virtual viewpoint video image space with the correct orientation. The number of RF tags attached to an object may be four or more and for example, for an object whose shape may change, by embedding more RF tags, it is also made possible to approximate the shape at that time from the coordinates of each RF tag and arrange the object on the virtual viewpoint video image space. Further, by using an RF tag by which not only the positional information but also information on the direction in which the object faces can be obtained, it is possible to implement a highly accurate arrangement.

As above, according to the present embodiment, positional information is acquired from an equipment object motionless in the image capturing scene and the three-dimensional model of the equipment object is arranged on the virtual viewpoint video image space. Due to this, it is possible to generate a natural virtual viewpoint video image in which an equipment object does not disappear suddenly.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to prevent an object that should exist in a virtual viewpoint video image from disappearing suddenly.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-075361, filed Apr. 11, 2019, which is hereby incorporated by reference wherein in its entirety.

What is claimed is:

1. An information processing apparatus comprising:
one or more memories storing instructions; and
one or more processors that execute the instructions to:
  generate a silhouette image representing a silhouette of a first object based on a difference between a captured image and a background image updated during an image capturing period, wherein the first object is included in the captured image input in a time series and captured for generating a virtual viewpoint image and the first object behaves as a moving object during the image capturing period;
  generate, using the generated silhouette image, first three-dimensional shape data representing a three-dimensional shape of the first object;
  output the generated first three-dimensional shape data;
  acquire positional information for specifying a position of a second object, which is included in the captured image and behaves as a still object for at least a certain period of time during the image capturing period, from a positional information notification device included in the second object or attached on the second object; and
  output, based on the acquired positional information, second three-dimensional shape data prepared in advance representing a three-dimensional shape of the second object.

2. The information processing apparatus according to claim 1, wherein:
the positional information notification device comprises an RF tag, and
the positional information includes information on a distance from an antenna to the RF tag and a direction viewed from the antenna, in which the RF tag exists, obtained based on an electromagnetic field intensity, in a state where the antenna receives an electric wave transmitted from the RF tag.

3. The information processing apparatus according to claim 2, wherein:
the number of antennas is two or more,
the one or more processors obtains a plurality of pieces of positional information based on the electromagnetic field intensity, in a state where each of the plurality of antennas receives the electric wave, and
the second three-dimensional shape data is output based on the obtained plurality of pieces of positional information.

4. The information processing apparatus according to claim 2, wherein:
the number of RF tags included in the second object or attached on the second object is two or more, and
the second three-dimensional shape data is output based on a plurality of pieces of positional information obtained from the RF tags.

5. The information processing apparatus according to claim 1, further comprising:
a display device configured to display a UI screen that allows a user to select the second object.

6. The information processing apparatus according to claim 1, the one or more processors execute the instructions to generate the virtual viewpoint image based on the acquired positional information and the output second three-dimensional shape data.

7. The information processing apparatus according to claim 1, wherein the first object is a person and the second object is an equipment.

8. The information processing apparatus according to claim 1, wherein the second object is a ball.

9. The information processing apparatus according to claim 1, wherein:
the second object and the first object are captured for generating the virtual viewpoint image at a specific time,
the second three-dimensional shape data corresponds to the specific time, and
the second three-dimensional shape data further includes the first three-dimensional shape data and that is generated based on an image captured at the specific time.

10. The information processing apparatus according to claim 1, wherein the processor outputs space data in which the second three-dimensional shape data is arranged in a three-dimensional space of the virtual viewpoint image based on the acquired positional information.

11. A control method of an information processing apparatus, the control method comprising:
generating a silhouette image representing a silhouette of a first object based on a difference between a captured image and a background image updated during an image capturing period, wherein the first object is included in the captured image input in a time series and captured for generating a virtual viewpoint image and the first object behaves as a moving object during the image capturing period;
generating, using the generated silhouette image, first three-dimensional shape data representing a three-dimensional shape of the first object;
outputting the generated first three-dimensional shape data;
acquiring positional information for specifying a position of a second object, which is included in the captured image and behaves as a still object for at least a certain period of time during the image capturing period, from a positional information notification device included in the second object or attached on the second object; and
outputting, based on the acquired positional information, second three-dimensional shape data prepared in advance representing a three-dimensional shape of the second object.

12. A non-transitory computer readable storage medium storing a program executable by a computer to perform a control method for an information processing apparatus, the control method comprising:
generating a silhouette image representing a silhouette of a first object based on a difference between a captured image and a background image updated during an image capturing period, wherein the first object is included in the captured image input in a time series and captured for generating a virtual viewpoint image and the first object behaves as a moving object during the image capturing period;
generating, using the generated silhouette image, first three-dimensional shape data representing a three-dimensional shape of the first object;
outputting the generated first three-dimensional shape data;
acquiring positional information for specifying a position of a second object, which is included in the captured image and behaves as a still object for at least a certain period of time during the image capturing period, from a positional information notification device included in the second object or attached on the second object; and
outputting, based on the acquired positional information, second three-dimensional shape data prepared in advance representing a three-dimensional shape of the second object.

* * * * *